United States Patent [19]
van den Nieuwelaar et al.

[11] Patent Number: 4,928,351
[45] Date of Patent: May 29, 1990

[54] METHOD AND DEVICE FOR OPERATING AN INSTALLATION FOR DIVIDING UP SLAUGHTERED POULTRY AND FOR TEMPORARILY INTERRUPTING THE TRANSPORT OF POULTRY CARCASSES OR PARTS

[75] Inventors: Adrianus J. van den Nieuwelaar, Gemert; Petrus C. H. Janssen, Wilbertoord, both of Netherlands

[73] Assignee: Stork PMT B.V., Netherlands

[21] Appl. No.: 278,584

[22] Filed: Dec. 1, 1988

[30] Foreign Application Priority Data

Dec. 1, 1987 [NL] Netherlands ............ 8702887

[51] Int. Cl.⁵ ............................................ A27C 21/00
[52] U.S. Cl. ......................................... 17/11; 17/44.1; 17/24
[58] Field of Search ................. 17/11, 44.1, 45, 24

[56] References Cited

U.S. PATENT DOCUMENTS

| 3,622,000 | 11/1971 | McClenny | 17/11 |
| 3,642,130 | 2/1972 | Altenpohl | 209/121 |
| 3,811,555 | 5/1974 | Scheier et al. | 198/177 |
| 4,094,413 | 6/1978 | Altenpohl et al. | 17/44.1 |
| 4,187,945 | 2/1980 | Altenpohl et al. | 17/24 |
| 4,412,620 | 11/1983 | Altenpohl et al. | 17/44.1 |
| 4,627,007 | 12/1986 | Muschany | 17/45 |
| 4,765,028 | 8/1988 | van de Nieuwelaar et al. | 17/11 |
| 4,813,101 | 3/1989 | Brakels et al. | 17/11 |

FOREIGN PATENT DOCUMENTS

| 0067462 | 12/1982 | European Pat. Off. . |
| 0159731 | 10/1985 | European Pat. Off. . |
| 0244888 | 11/1987 | European Pat. Off. . |
| 0259920 | 3/1988 | European Pat. Off. . |
| 2828711 | 4/1979 | Fed. Rep. of Germany . |
| 3209730 | 9/1983 | Fed. Rep. of Germany . |
| 8606587 | 11/1986 | PCT Int'l Appl. . |

Primary Examiner—Willis Little
Attorney, Agent, or Firm—Ostrolenk, Faber, Gerb & Soffen

[57] ABSTRACT

Method for operating an installation for dividing up slaughtered poultry in a number of processing stations along a transport track in which the displacement of the delivered birds or parts thereof is temporarily interrupted at the location of an observation station, while maintaining the movement of the transport track.

23 Claims, 7 Drawing Sheets

METHOD AND DEVICE FOR OPERATING AN INSTALLATION FOR DIVIDING UP SLAUGHTERED POULTRY AND FOR TEMPORARILY INTERRUPTING THE TRANSPORT OF POULTRY CARCASSES OR PARTS

BACKGROUND OF THE INVENTION

The invention relates to a method for operating an installation for dividing up slaughtered poultry or parts thereof in a number of processing stations located along a transport track and to an installation for dividing up slaughtered poultry or parts thereof comprising a number of operating stations arranged along a transport track for the latter.

Installations for dividing up carcasses or carcass parts of slaughtered poultry in a number of consecutive processing stations are known. The obvious aim of this processing is to achieve an optimum production result by choosing the most favourable dividing method for birds or poultry parts having a certain weight or a certain shape, this being possible by allowing the birds to pass certain processing stations while not allowing it to pass others. Of course, one depends totally upon the predictability and the promises made by the supplier of the birds in respect of weight and shape of the birds delivered. If a delivered batch of birds includes birds whose weight and shape do not correspond to the predictions or expectations these birds are nevertheless processed in the manner set and chosen for this batch and the result obtained will then not be optimal.

The invention has the object of overcoming this drawback.

SUMMARY OF THE INVENTION

According to the invention this aim is achieved in that displacement of the delivered birds or parts thereof is temporarily interrupted at the location of an observation station, while maintaining the movement of the transport track, and the particular bird or bird part is examined for at least one criterion so that the processing to which the bird or poultry part is to be subjected can be determined depending on the result of this examination.

Direct production control resulting in a higher yield and optimum adjustment of the end product to the characteristics of the birds supplied is implemented by this method.

Due to the fact that the movement of the transport track as such is not influenced, the capacity of the dividing-up installation is not reduced; moreover, this method can be used right away with already existing installations, which do not have to undergo radical modification.

Interruption of the movement of the poultry which can take place at a predetermined position (interruption station) can, for example, be used before visual inspection of a carcass or carcass part at this location or projection of an image thereof on a screen for an automatic comparison with the image of a "standard" bird and before weighing of a carcass or carcass art. The latter will occur most frequently in practice. It is also conceivable that a certain operation is carried out, such as irradiation with ionizing radiation for sterilization of the carcass or carcass part.

On the basis of the observations made it can be determined, possible in an automated fashion, which further dividing-up operations are the most suitable for the carcass of carcass part and, for example, whether further operations are to be carried out or the carcass or carcass part is to be removed from the track or discharged to certain processing stations. It is also possible to use the observations for setting the adjustments of the respective processing units.

Such an inspection of the carcasses or carcass parts supplied for processing overcomes the disadvantageous influence of the fact that delivered products show great variation in respect of weight and dimensions and results in a specific carcass being processed in the most optimum manner because a dividing-up operation adapted to suit this carcass is carried out.

The invention furthermore relates to a method for the temporary interruption of the transport of a poultry carcass or part thereof which is carried along using a transport track of the type known from NL-A-8 400 919 (EP-A-0 159 731) or NL-A-8 204 464, in which leg-guiding edges cooperate with drivers.

This method is perferably carried out in such a way that at the location of the desired transport interruption the leg is brought outside the operating range of the drivers and shortly before arrival of a subsequent leg, delivered by a driver, is brought inside the driver operating range again for further transport. Preferably the leg temporarily brought outside the operating range of the drivers is brought after displacement inside the operating range of the driver following the delivering driver. It is, however, also possible that the leg temporarily brought outside the operating range of the drivers is brought inside the operating range of the driver delivering the leg.

An installation according to the invention comprises a device for temporarily interrupting, while maintaining the movement of the transport track, the displacement of the poultry parts at an observation station for examining at least one criterion of the delivered birds or poultry parts; a device for evaluating the result of this examination, and a device for controlling, depending this evaluation, the operation to be carried out by the processing stations on a specific bird or specific poultry part.

The invention furthermore provides a device for temporarily interrupting, at a predetermined position the transport of a poultry carcass or part thereof suspended from at least one leg, included in a transport track with at least two leg-guide edges located at a distance from each other and directed towards each other and with drivers driven in the transport direction and arranged at a mutual distance, in particular for an installation as described above, with means for temporarily bringing at least one leg outside the driver operating range and for subsequently bringing at least one leg inside this range again.

In a preferred embodiment the guide edge, as seen in the transport direction and upstream of said position the guide edges diverge in a feed part of the device to guide edge parts in an intermediate part at the location of the leg transport interruption position—in which the legs are free of the drivers—and subsequently converge in a discharge part to the original distance; support edges located opposite the guide edge parts thereof and cooperating therewith are fitted in feed part, intermediate part and discharge part; and a controlled driver member acting upon the leg of the carcass or carcass part in the transport direction is fitted at the location of the intermediate part.

In a preferred embodiment the angle included by the guide edge part of the feed part with the longitudinal axis of the transport track is greater than the angle included by the guide edge part of the discharge part with this longitudinal axis.

Preferably the outermost guide edge and the innermost support edge cooperating therewith are movable, mutually coupled relative to the support edges of feed part and discharge part in a vertical direction in at least the intermediate part.

The coupled outermost and innermost guide edges can be connected to a weighing device and/or to a signalling device.

The driver member is preferably designed as a drive vane rotatably driven about a spindle rotating transversely to the transport direction and synchronized with the movement of the transport track.

In an embodiment in which the drivers are coupled to a transport chain, said spindle is preferably coupled to a gearwheel in engagement with this transport chain.

In an other preferred embodiment an element supporting the chain is fitted underneath the transport chain at the location of the gearwheel engaging thereupon. Then preferably the chain is lifted by the supporting element over a distance such that the driver fixed thereto comes free of the transport track at the location of the support.

Finally the driver member can be coupled to an element for delivering a signal during a specific part of the path of this driver member.

DESCRIPTION OF PREFERRED EMBODIMENTS

FIGS. 1a-1d show one half of a double transport track for carcasses or carcass parts of slaughtered poultry in which legs separated from the carcass, carcass parts divided lengthwise or carcass parts still suspended from both legs are supported and carried away before being subjected to further processing. Such a transport track is of the type known from NL-A-8 400 919 (EP-A-0 159 731) in the name of the Applicant which are included herein by reference and comprises a fixed guide 2 having a guide edge 4 which cooperates with the drivers which are shown by reference numerals 6a . . . 6d. The leg 8 of a carcass part is clamped between the guide edge 4 of the guide 2 and a support edge 10 of the particular driver as known per se.

At the place of the transport interruption station 12, the guide edge 4 is provided with a part 14 strongly diverging outwards, an intermediate part 16 and a part 18 again converging inwards. Opposite this is arranged a fixed support part 20 with a support edge 22 likewise diverging outwards, an intermediate support edge part 24 and an inwardly converging part 26. The intermediate part 24 touches line 28, which passes through the outer edges 30 of the drivers 6a . . . 6d. The angle included by the diverging edges with the transport track longitudinal axis is larger than the angle included by the converging edges with this longitudinal axis.

Figure 1A:
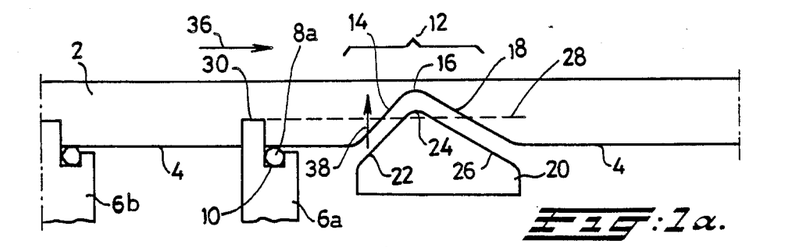
FIGS. 1a to 1e inclusive are diagrammatic drawings with reference to which the operating principle of a station in which the poultry transport is temporarily interrupted is illustrated.
Figure 1B:
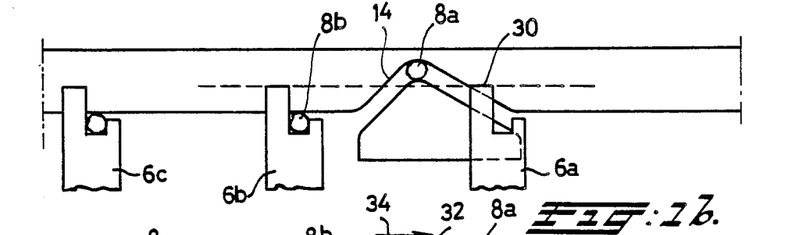
Figure 1C:
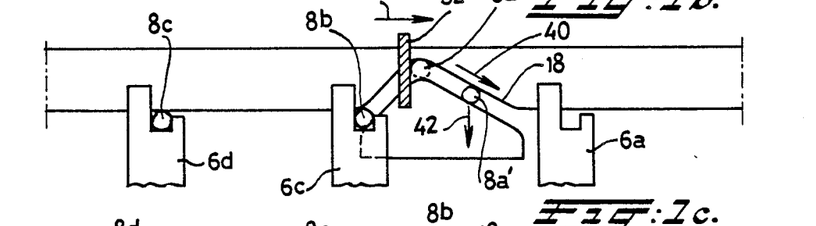
Figure 1D:
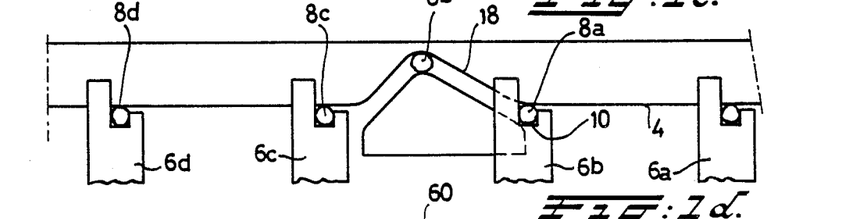

Furthermore, a controlled driver member 32, which is shown in FIG. 1c and the lower edge of which can be moved in the direction of the arrow 34, is arranged at the location of the intermediate parts 16 and 24. The function of this driver member 32 will be further explained in the text which follows.

The operation of this transport interruption station is as follows:

A leg 8a supplied via a driver, for example the driver 6a, in the direction of the arrow 36 is pushed away, when this leg 8a arrives in the guide space between the edges 14 and 22, by the guide edge 22 in the direction of the arrow 38 and automatically comes to rest between the edges 16 and 24, as shown in FIG. 1b. In this position, the leg 8a is completely free of the driver 6a which thus moves on without a leg. The driver 6b following the driver 6a meanwhile approaches the transport interruption station 12 while carrying along the following leg 8b. When the driver 6d with the leg 8d is in the position shown in FIG. 1c the leg 8a is pressed away by the driver member 32 driven in the direction of the arrow 34 in the direction of the arrow 40 into the position shown by 8a' in FIG. 1c. The space between the guide edges 16 and 24 is then free and the leg 8b is pressed into this space—this is the situation shown in FIG. 1d. In the meantime, this same driver 6b has taken up the leg 8a in the position according to FIG. 1c and during the further movement thereof the converging edge 18 presses the leg 8a in the direction of the arrow 42 and thus into the space between the support edge 10 and the support edge 18. The leg then arrives again between the support edge 10 and the right-hand support edge 4 and is transported away further in the normal manner.

All this is repeated for legs 8c, 8d, etc., which are supplied by the following drivers 6c, 6d, etc.

It is evident from the above that the legs are present in the position in which they are free of the drivers and in which they are thus not transported during a period which is virtually identical to the time which elapses between passage of two consecutive drivers at a predetermined position.

Figure 1E:
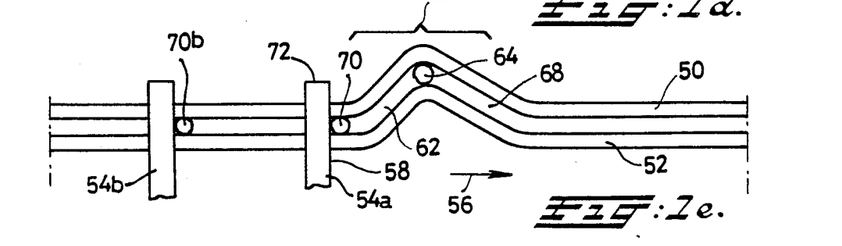

FIG. 1e shows that the principle according to the invention can also be used with a transport track of the type in which two fixed guides 50, 52 cooperate with simple drivers 54 with a pressure edge 58 which is transverse to the transport direction 56, as known from NL-A-8 204 464 which is included herein by reference. The transport interruption station 60 again has a diverging feed part 62, an intermediate part 64 and a converging discharge part 68. A leg 70 supplied by a driver 54 becomes free of the upper edge 72 of the driver 54 at the location of the intermediate part 64 and is thus not transported further; when the subsequent driver 54b approaches with the leg 70b carried along by it, the leg present at position 64 is pressed away in time by the driver member—not shown in this figure—in the direction of the arrow 56 and is carried along by the driver 54b.

It is to be noted that a combination having a driver member controlled in the correct way can also be implemented with a suitable configuration of feed part, intermediate part and discharge part in that a leg brought outside the operating range of a driver is again brought, after the stationary period, by the driver member inside the operating range of this same driver and is transported further by the latter.

Figure 2:
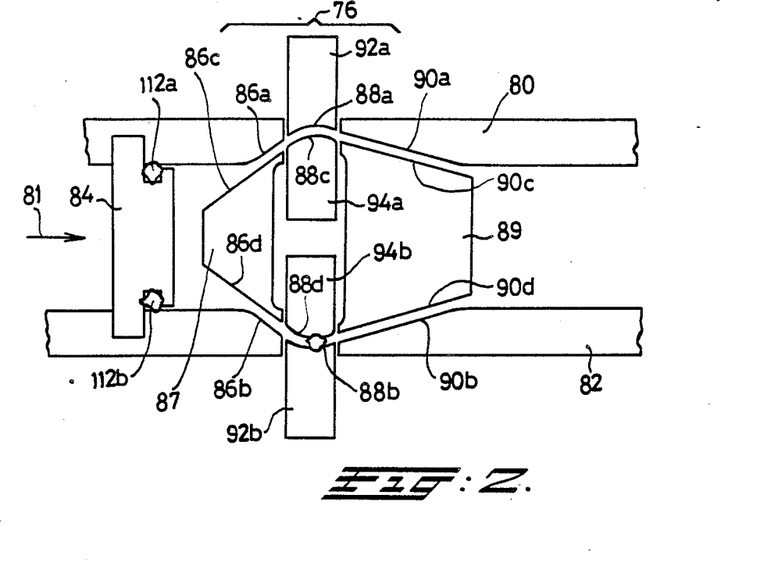
FIG. 2 is a diagrammatic top view of an embodiment according to the invention in which the poultry is weighed during the interruption of transport.
Figure 3:
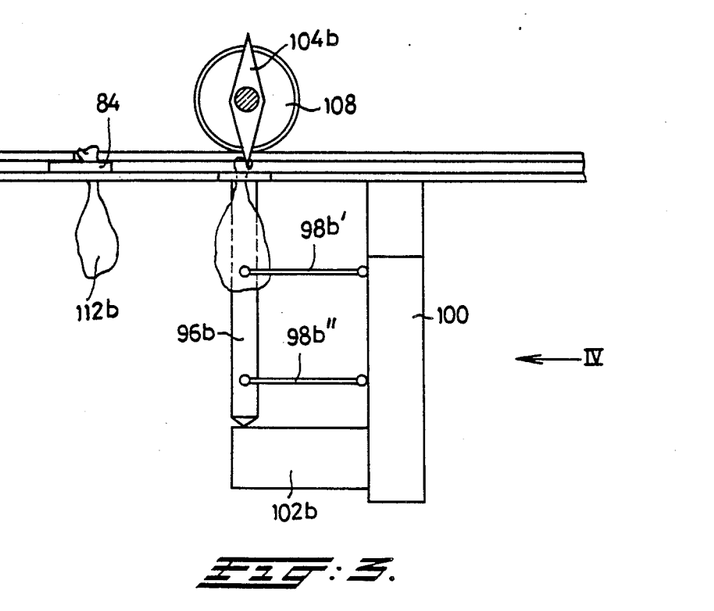
FIG. 3 is a side view of this embodiment.
Figure 4:
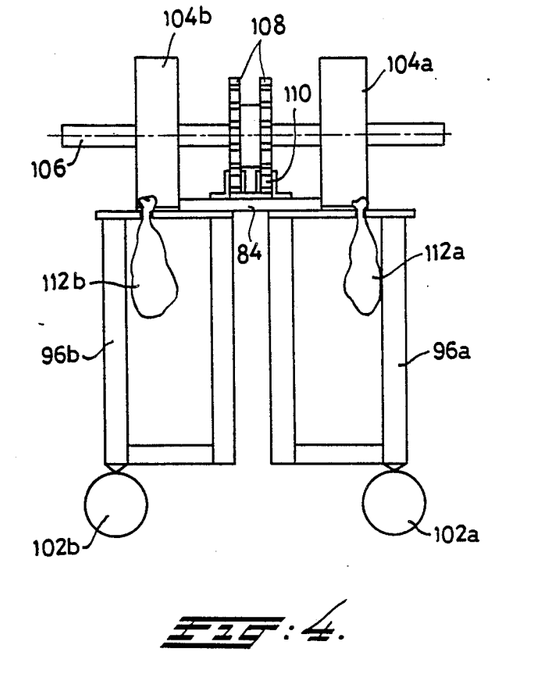
FIG. 4 is a view in the direction of the arrow IV in FIG. 3.
Figure 5:
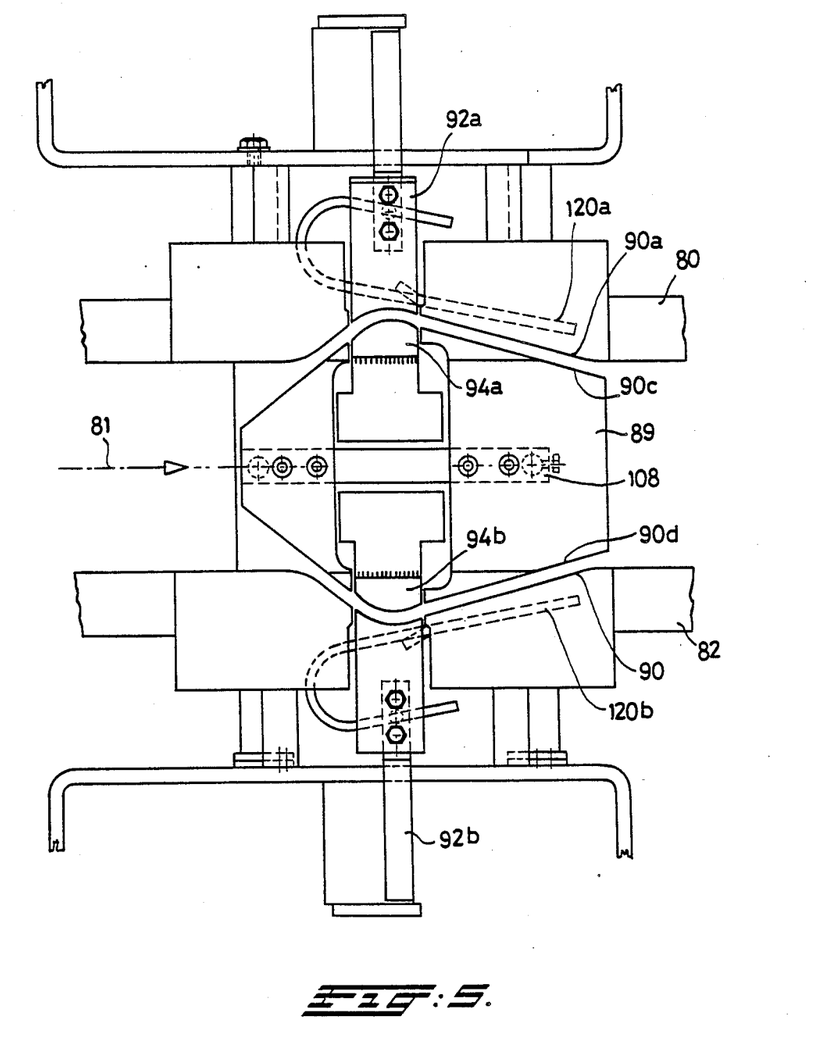
FIG. 5 is a more detailed top view of the embodiment according to FIG. 3.

FIGS. 2-4 show an embodiment in which the carcass parts delivered—in this case legs—are weighed in the transport interruption station 76. In this case, there are support guides 80, 82 which form the transport track in combination with the drivers 84—one of which is shown in the drawing. The diverging feed parts 86a, 86b, the intermediate parts 88a, 88b and the converging discharge parts 90a, 90b are again to be found at the location of the transport interruption station 76. The support edges 86c, 86d which are likewise stationary and diverging and are formed at the fixed part 87 are arranged opposite the—stationary—diverging feed parts 86a, 86b, and the fixed support walls 90c and 90d, respectively, which are also converging are arranged at the fixed part 89 opposite the stationary converging discharge parts 90a, 90b. The support edges 88a and 88b are not stationary but form the end edges of an element 91a and 92b, respectively, which is movable in the vertical direction, while the opposite support edges 88c, 88d which are also non-stationary are the end edges of an element 94a and 94b, respectively, which is also movable in the vertical direction. The elements 92a and 94a are coupled to each other as are the elements 92b and 94b; furthermore, they are coupled to a pressure-sensitive weighing member 102 via a pressure rod 96 (for the elements 92b and 94) shown in FIG. 3 and guided via the parallelogram arms 98b', 98b'', which are fixed at the fixed support 100.

Finally, a driver blade 104a and 104b, respectively, fixed at the spindle 106 is arranged above each transport tract. This spindle 106 is driven by a double gear wheel 108 which is in engagement with the chain 110 carrying the drivers. Use of such a chain is known per se from NL-A-8 400 919. Of course, it is also possible to use a driver member describing a horizontal path instead of the rotating driver ring shown.

Operation is as described above: the transport movement in the direction of the delivered carcass parts 112a, 112b is temporarily interrupted at the location of the transport interruption station 84. This interruption period is used to determine the weight of the carcass or of the carcass parts because the elements 92a, 94a and 92b, 94b, respectively, are then loaded by the weigh of the carcass part and this weight is transmitted to the associated weighing cell 102a and 102b, respectively. Other characteristics (such as circumference, thickness, color, bone fractures) can also be determined.

Figure 6:
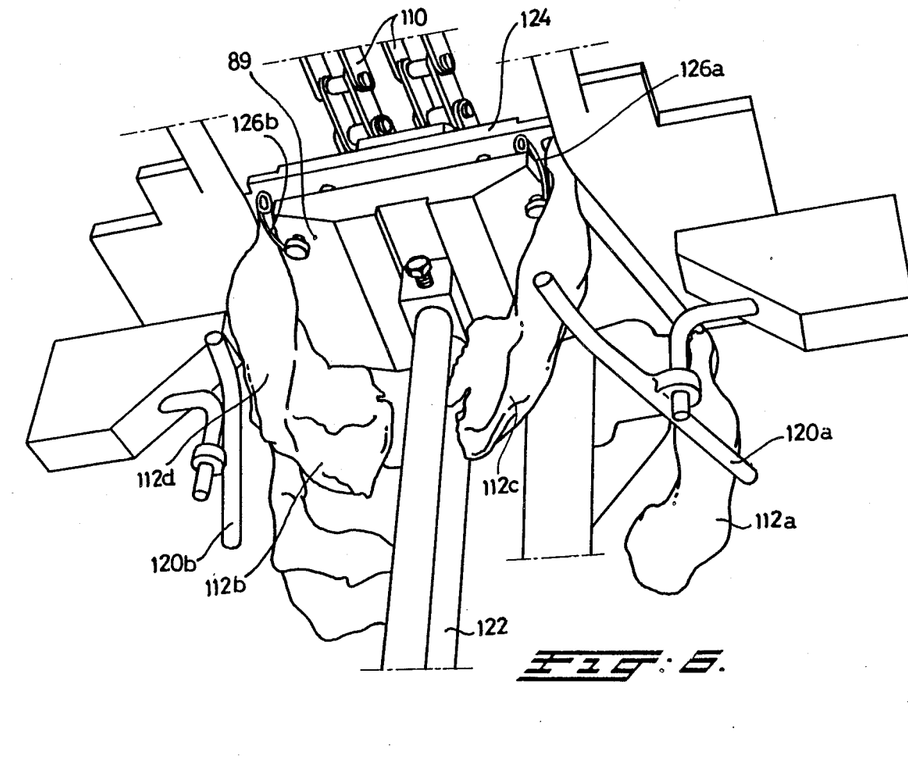
FIG. 6 is a perspective bottom view of this embodiment.

In FIGS. 5 to 8 inclusive, parts which correspond with those already discussed with reference to FIGS. 2 to 4 inclusive are given the same reference numerals. These figures show a few more details of the device according to the invention and, in particular—see FIGS. 5 and 6—show the guide rods 120a and 120b (shown completely in FIG. 5 and only partly in FIG. 6) which are sited underneath the transport track parts 80 and 82 and extend more or less parallel to the converging discharge parts 90a–90d, and the support 112 of the fixed part 89. FIG. 6 shows the carcass parts 112a and 112b which are located at the location of the intermediate part and thus held temporarily stationary as well as the carcass parts 112c and 112d and are carried along. FIG. 6 also shows the hairpin-shaped pressure springs 126a, 126b which are fixed to the fixed part 89 and act to press the legs of the carcass parts into the recesses of the driver taking along the parts—in this case the driver 124—at the end of the discharge part.

Figure 7:
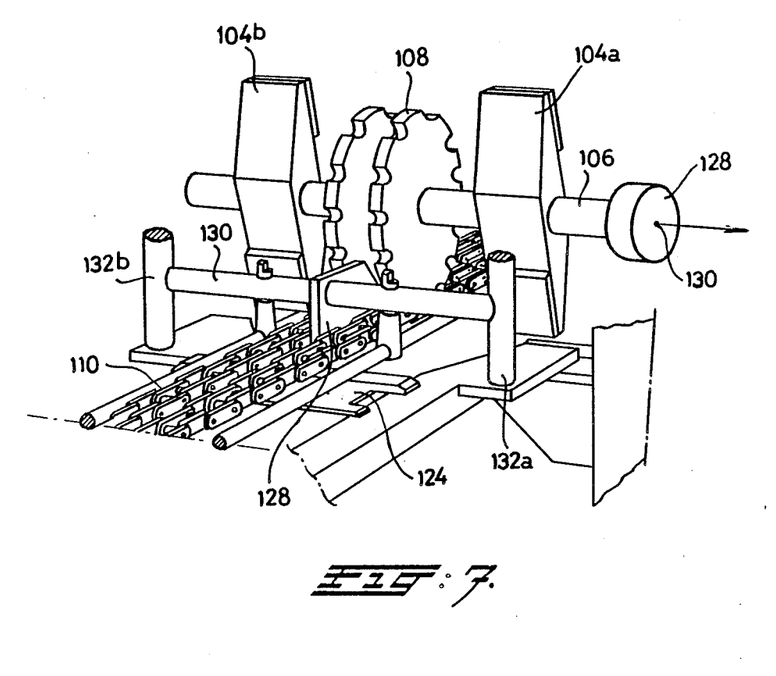
FIG. 7 is a perspective front view of this embodiment.

FIG. 7 shows the manner in which a position detector 128 which emits a signal representative of the position of the spindle 106 and, because the rotation of this spindle is coupled to the movement of the chain 110k of the position of the drivers at the output 130 is fitted on the spindle 106. In this manner, it is possible to deliver a signal when a carcass has come to a standstill in the intermediate part and this signalling can be used, for example, to control an inspection device, an irradiation device or a weighing device.

Figure 8:
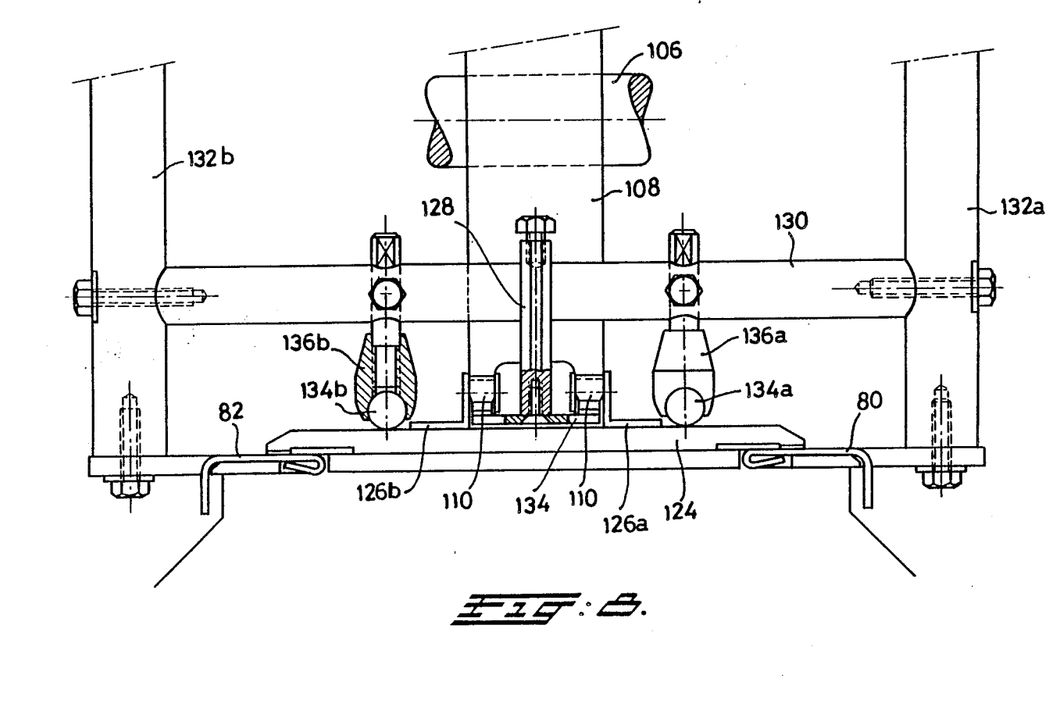
FIG. 8 shows a preferred embodiment of the manner of driving the controlled driver member used according to the invention.

For a good synchronization between the movement of the driver members 104a, 104b and the movement of the drivers delivering the carcass parts it is, of course, necessary for the gear wheel 108 which is fixed on the spindle 106 to be in permanent engagement with the double chain 110. For this purpose—see, in particular, FIG. 8—the following construction is used:

Each driver, such as the driver 124, shown in FIG. 8, is fixed in a manner known per se to the angular pieces 126a, 126b. The carrier 128 which is fixed to the carrier rod 130 which is in turn carried by the columns 132a, 132b which are fixed in the frame of the device is arranged between the two chain parts. At its underside, the carrier 128 carries a pressure plate 134 which locally supports the chain 110, in particular such that the chain is lifted to some extent in order to remain in engagement with the gear wheels, as a result of which the drivers which are also fixed thereon, such as the driver 124 are at the location of the transport interruption station freed from the support edges 80 and 82 and also from the parts 92a, 92b. It is prevented in this manner that the weight of chain and drivers is incorporated in the weighing result.

The guide rods 134a, 134b which extend parallel to the support edges 80 and 82 and are taken up in the carriers 136a, 136b which are fixed in the transverse rod 130 are located above the drivers.

It is to be noted that, although the invention is illustrated with reference to an embodiment for processing of legs not connected to each other, it is also possible to use it for processing complete carcasses suspended from both legs—of course with a suitable modification of the device. Thus, the movable intermediate parts above the transport track can be connected to each other and to a weighing device and the drivers can be given a separate design. The invention of course needs no modification when the transport interruption used for manipulation other than weighing, for example inspection or radiation of a complete carcass.

What is claimed is:

1. Installation for dividing up slaughtered poultry or parts thereof comprising:
   a plurality of operating stations at which the poultry or parts may be operated upon; a transport track for transporting the poultry or parts thereof along a path past the operating stations in sequence; support and moving means at spaced intervals along the transport track for supporting a poultry or part thereof and moveable along the path of the transport track to the stations in sequence;

at a first one of the operating stations, an interrupting device for temporarily interrupting the transport by the respective moving means of the poultry or part then passing the first station, while maintaining the movement of the transport track and the moving means and of the other poultry or parts thereof, the interrupting device comprising means for displacing the poultry or part off the path of the transport track;

examining means at the first station for examining at least one criterion of the poultry or part; an evaluating device for evaluating the result of the examination by the examining means and a control device for controlling the subsequent operation upon the poultry or part depending upon the evaluation by the evaluating device.

2. The installation of claim 1, further comprising a connection between the controlling device and others of the operating stations wherein the controlling device controls the operations to be carried out at some of the other operating stations depending upon the evaluation of the specific poultry or part.

3. The installation of claim 1, wherein the transport track further comprises first and second guide edges spaced from each other and generally at the first operating station, the first guide edge being oriented for guiding the poultry or part thereof laterally off the path of the track to the examining means and the second guide edge guiding the poultry or part thereof laterally back to the path of the track.

4. The installation of claim 3, wherein the support and moving means comprises a plurality of drivers at the track for being moved along the track, and each of the drivers being adapted for supporting a respective poultry or part thereof; the drivers being shaped so as to move their respective poultry or part along the track and being further shaped that the driver moves the poultry or part along the first guide edge far enough until the poultry or part is moved out of engagement with the driver, and the second guide edge and the driver being so shaped that the poultry or part is engaged by another of the drivers as the poultry or part moves along the second guide edge back toward the track.

5. The installation of claim 4, wherein the driver is adapted for supporting the poultry or part by a leg thereof, and the guide edges comprise leg guide edges for guiding the movement of the leg, and thereby the movement of the poultry or parts.

6. The installation of claim 4, further comprising an additional driver at the first station for engaging a poultry or part thereof and moving it to the examining means after it has moved out of engagement with the driver and for pushing the poultry or part thereof along the second guide edge to a location where the poultry or part is engaged by the next driver in sequence that is then moving along the track and is then passing the first of the operating stations.

7. The installation of claim 6, further comprising respective first and second support edges spaced from and cooperating with the first and second guide edges for guiding the poultry or part thereof so that the respective driver and the additional driver moves the poultry or part along the path of the first and second guide edges; at the first station, the first of the guide edges diverge away from the path of the track and the second guide edge converges toward the path of the track, wherein the first guide edge is the feed part and the second guide edge is the discharge part, and the first and second of the guide edges intersect the longitudinal axis of the transport track in the vicinity of the operating station at respective angles.

8. Device according to claim 7, in which the angle included by the first guide edge with the longitudinal axis of the path of the transport track is greater than the angle included by the second guide edge part with this longitudinal axis.

9. Device according to claim 7, in which in at least the intermediate part the outermost guide edge and the innermost support edge cooperating therewith are mutually coupled movable, relative to the support edges of feed part and discharge part in a vertical direction in at least the intermediate part.

10. Device according to claim 9, in which the coupled outermost and innermost guide edges are connected to a weighing device.

11. Device according to claim 9, in which the coupled outermost and innermost guide edges are coupled to a signalling device.

12. Device according to claim 7, in which the additional driver comprises a drive vane rotatably driven about a spindle rotating transversely to the path of the transport back and synchronized with the movement of the transport track.

13. Device according to claim 12, in which the track comprises a transport chain and the drivers are coupled to the transport chain, the spindle being coupled to a gearwheel in engagement with the transport chain.

14. Device according to claim 10, in which an element supporting the chain is fitted underneath the transport chain at the location of the gearwheel engaging thereupon.

15. Device according to claim 14, in which the chain is lifted by the supporting element over a distance such that the driver fixed thereto comes free of the transport track at the location of the support.

16. Device according to claim 12, in which the driver member is coupled to an element for delivering a signal during a specific part of the path of this driver member.

17. Method for operating on an installation for dividing up slaughtered poultry or parts thereof comprising:
installing slaughtered poultry or parts thereof spaced along a moveable transport track;
moving the transport track and the supported poultry in sequence along a path past a number of processing stations; temporarily interrupting the movement of each of the poultry or parts at one station while maintaining the movement of the transport track and of the other poultry or parts installed on the transport track;
examining the halted poultry or part for at least one criterion at the one station for determining if the processing of the poultry or part is to be adjusted depending upon the results of the examination.

18. The method of claim 17, further comprising after examining the halted poultry or part, returning the halted part to being moved along the transport track.

19. The method of claim 17, wherein the one station is laterally offset from the path of the track and the interrupting comprises shifting the poultry or part laterally off the path off the track.

20. The method of claim 19, wherein after the poultry or part has been shifted laterally to the one station and has been examined, returning the poultry or part laterally to the path of the track.

21. The method of claim 19, wherein the moveable track has a plurality of drivers thereon, each for moving a respective poultry or part thereof, the driver having a dimension in the direction laterally of the path of the track, and the interrupting comprises moving the poultry or part laterally beyond the lateral dimension of the driver therefor.

22. The method of claim 21, wherein after the poultry or part has been shifted laterally to the one station and has been examined, returning the poultry or part laterally to the path of the track by moving the poultry or part back within the lateral dimension of the drivers.

23. The method of claim 17, further comprising dropping poultry or parts of particular weight over collection bins positioned under the track.

* * * * *